Figure 1:
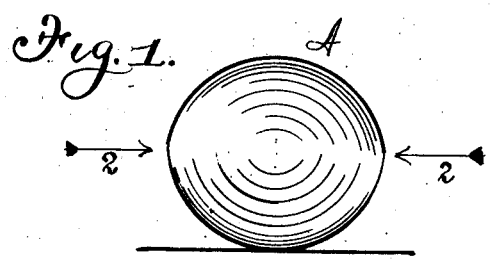

P. M. MILLER.
MEDICINAL EFFERVESCING CAPSULE.
APPLICATION FILED JAN. 29, 1918.

1,356,544.  
Patented Oct. 26, 1920.

INVENTOR  
Philip M. Miller

UNITED STATES PATENT OFFICE.

PHILIP M. MILLER, OF BROOKLYN, NEW YORK, ASSIGNOR, BY MESNE ASSIGNMENTS, TO P. M. MILLER HYGIENIC SPECIALTY COMPANY, A CORPORATION OF NEW YORK.

MEDICINAL EFFERVESCING CAPSULE.

1,356,544. Specification of Letters Patent. Patented Oct. 26, 1920.

Application filed January 29, 1918. Serial No. 214,394.

*To all whom it may concern:*

Be it known that I, PHILIP M. MILLER, a citizen of the United States, residing in Brooklyn, in the county of Kings and State of New York, have invented certain new and useful Improvements in Medicinal Effervescing Capsules, the specification of which is the following, reference being had to the accompanying drawings.

My invention relates to improvements in medicinal effervescing capsules of the class designed and constructed to have means for carrying medicinal substances, either solid or liquid, into the vaginal canal and for effervescingly feeding and bathing the structural parts thereof and of the cervix uteri organ, as hereinafter substantially described.

It includes improvements in detail of construction of means for providing one container or shell so structurally devised that it may specifically encapsule two various chemical substances or compounds, without being prematurely and chemically, or otherwise, acted upon by each other, as hereinafter substantially described.

The main advantages of my improved medicinal effervescing capsule are, first, that the container or shell is provided with a partition in the center to form two separate compartments each for inclosing an unsimilar chemical substance or compound, and the wall of the shell proper is pharmaceutically combined or intermixed with a medicinal substance; second, that the direct carrying into the vagina and against the cervix uteri and their adjacent structures of desired medicinal substances and the medicinally and hygienically feeding the diseased parts thereof, by one means containing two or three different chemicals or compounds which, when the container is melted under the body temperature latent in the vagina, chemically react upon each other thus effervescingly raising and carrying the desired medicinal substance or substances to or against the diseased structures; and third, the minute quantities of medicinal substances often used in the treatment of the vagina and cervex uteri parts, are inevitably wasted when introduced into the vagina and deposited therein, owing to the anatomical and pathological conditions of those structures, and, therefore, the diseased parts are not benefited and the respective medicinal substances either ineffectively remain in an obscure state among the folds of the sound structures or fall out therefrom, while with the effervescing characteristics of the capsule, the effect of the same is carried out in accordance with the intentions of the applicator as hereinbefore described.

Other particular advantages will be appreciated and appear from a detailed description of the invention in connection with the drawings forming a part thereof.

Figure 2:
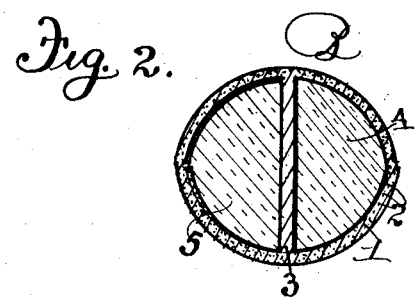

In the specific embodiment, in which I have chosen to illustrate my invention, for the purpose of clear disclosure, Figure 1 is a perspective view showing the device as a whole and ready for use; while Fig. 2 is a sectional view thereof taken on the line 2—2 as indicated by the arrows.

Referring to the drawings in detail, the effervescing capsule represents a combination structure and it serves in a multitude of ways and for a number of purposes, hereinafter described.

As illustrated, the container or shell A, shown as ovoid or approximately circular, may be of any suitable form and material. It is a shell constructed after and according to any manner or manners desired, the particular shape, material and arrangement of formation of the container with its interior part or parts being manifestly immaterial to accomplish the desired or intended results of the encapsulated medicinal substances therein. This shell is preferably formed of material or substances that are easily melting under the body temperature when introduced into the human orifice, such as the vagina, and is also flexible or brittle in consistency, although it may be of any consistency, such as gelatin, cocoa butter or other similar substances or compounds, as hereinbefore described. The shell or container, in Fig. 1 shown at A and in Fig. 2 at B, although may be formed of any suitable material, is preferably made either from animal jelly or cocoa butter intermixed or pharmaceutically compounded with a medicinal substance or chemical shown at 2 incorporated in the substance of the wall 1, that is to be carried into the vagina as a remedy. As illustrated, the shell is provided in the center with a wall or partition 3 thus dividing the interior thereof into two compartments 4 and 5 each to separately contain a chemical or compound, or a mixture, hereinbefore and hereinafter described.

Each chemical or compound deposited or encapsulated in each compartment, hereinbefore described and shown in Fig. 2 at 4 and 5, and to be used in connection with the carrying of the remedy into effect, thus saturating the diseased parts with the applied drugs or chemicals, may be made up from any suitable substance or chemical that will perform the chemical functions of an alkali and an acid reacting upon each other when brought or caused to be brought into close contact at the instant of the melting of the shell wall 1 under the body temperature latent in the vagina. These chemicals or compounds, either solid or liquid, are each separately deposited in one compartment when the same is suitably manufactured, and the partition 3, as shown, forms a barrier between the two substances, such as an alkali and acid, thus preventing their prematurely and chemically reacting upon each other. The character of the alkali and acid is not essential, and any such chemicals may be used, as the inventive principles consist in carrying medicinal substances into the vagina, hereinbefore described, as a remedy by the effervescing characteristics when those two chemicals are brought or mixed together after the walls of the container or shell give way under the melting point of the body temperature, thus bubblingly rising and raising the introduced medication against the parts in the vicinity thereof and bathing the diseased structures, as hereinbefore described.

The desired medication, although hereinbefore described and illustrated in Fig. 2 and shown at 2 as deposited or intermixed with the contents of the wall 1 of the shell B, may be suitably deposited either in the respective compartment together with the alkali or acid, in accordance with the permissible characteristics of both respective constituents to remain together in one compartment as to avoid any chemical reaction upon each other, or as hereinbefore described, the medication may be thoroughly incorporated in the substance of the wall of the shell, if found more convenient or practical to construct it so.

As hereinbefore particularly described, the capsule or shell is suitably filled, one compartment containing an alkali and the adjoining compartment containing an acid, together with the proper medication to be introduced into the human orifice, and hermetically or otherwise sealed so as to form one composite structure and be ready for use, as respectively shown in Fig. 1.

From the foregoing, in connection with the features of carrying out my inventive idea, it is essential that the sealed capsules are continuously stored in a cool place so as to avoid the access thereto of the temperature in the room, thus preventing the melting of the capsules by that temperature and prematurely causing the effervescing reaction of the chemicals contained therein. One sealed capsule, generally, will suffice to carry out one treatment, and is introduced into the vagina toward and against the cervex uteri and its adjacent parts, wherein it will, within 5 or 10 minutes, melt under the body temperature, and the effervescing reaction of each chemical will automatically assume to carry the incorporated medication to and against the adjacent and diseased structures thereby completely bathing and durably feeding the affected tissues and eventually destroying the germs embedded therein.

In order to fulfil all of the requirements of my invention, it is essential that the illustrative features, incorporated therein, are used as substantially hereinbefore described, and carried out as in accordance with the disclosure of my invention, to accomplish the intended results.

To those who are skilled in the art, it will be apparent that by means of the disclosure, I accomplish the fulfilment of all the objects and requirements herein set forth.

While I have illustrated and described my invention in accordance with the drawings, I desire it to be understood that the details of construction may be varied, and that many changes, modifications and substitutions may be made provided the means are employed without departing from the spirit and scope of my invention set forth in the claim.

Having thus described my invention, I desire to secure the same by Letters Patent in the following:

A vehicle, for the topical application of a medicament, comprising two substances capable of effervescent action when brought together in the presence of moisture so that a medicament incorporated therewith will be bodily carried along the surface to be treated by the effervescent action, and a protecting casing separating and inclosing said substances and of a size to permit its introduction into body cavities and automatically releasing them under such use.

PHILIP M. MILLER.